United States Patent
Yasui

(10) Patent No.: US 12,240,570 B2
(45) Date of Patent: Mar. 4, 2025

(54) SHIP ASSISTANCE DEVICE, SHIP ASSISTANCE METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 17/888,538

(22) Filed: Aug. 16, 2022

(65) Prior Publication Data

US 2023/0059059 A1    Feb. 23, 2023

(30) Foreign Application Priority Data

Aug. 20, 2021    (JP) .................... 2021-134934

(51) Int. Cl.
| | | |
|---|---|---|
| *B63B 39/14* | (2006.01) | |
| *B63B 79/10* | (2020.01) | |
| *B63B 79/20* | (2020.01) | |
| *B63B 79/40* | (2020.01) | |
| *G05D 1/00* | (2006.01) | |
| *G06T 7/215* | (2017.01) | |

(52) U.S. Cl.
CPC .............. *B63B 39/14* (2013.01); *B63B 79/10* (2020.01); *B63B 79/20* (2020.01); *B63B 79/40* (2020.01); *G05D 1/0875* (2013.01); *G06T 7/215* (2017.01)

(58) Field of Classification Search
CPC ......... B63B 79/10; B63B 79/15; B63B 79/20; B63B 79/40; B63B 39/14; B63B 39/00; G06T 7/215; G05D 1/0875; B63H 2021/216
See application file for complete search history.

(56) References Cited

U.S. PATENT DOCUMENTS

| | | | | |
|---|---|---|---|---|
| 9,476,970 | B1 * | 10/2016 | Fairfield | ................. G06T 7/74 |
| 2009/0193893 | A1 * | 8/2009 | Kandori | ............ G01C 19/5712 |
| | | | | 73/504.12 |
| 2015/0329048 | A1 * | 11/2015 | Wang | ....................... G06T 7/80 |
| | | | | 348/148 |
| 2016/0288884 | A1 * | 10/2016 | Edmunds | .............. B63B 39/005 |
| 2017/0061622 | A1 * | 3/2017 | Sakano | ..................... G06T 7/80 |
| 2017/0255205 | A1 * | 9/2017 | Hashizume | ......... G05D 1/0875 |
| 2017/0323154 | A1 * | 11/2017 | Kollmann | .............. G06V 20/59 |
| 2021/0394877 | A1 * | 12/2021 | Kadota | .................... B63B 79/40 |

FOREIGN PATENT DOCUMENTS

JP    2004-291688    10/2004

* cited by examiner

*Primary Examiner* — Stephen Holwerda
(74) *Attorney, Agent, or Firm* — Amin, Turocy & Watson, LLP

(57) ABSTRACT

A ship assistance device including a storage medium storing a computer-readable command and a processor connected to the storage medium, the processor executing the computer-readable command to: calculate a pitching amount of a ship body based on a plurality of images photographed by a camera mounted on the ship body; estimate a pitching cycle of the ship body at least based on the calculated pitching amount; predict pitching of the ship body based on the estimated pitching cycle; and control a throttle of the ship body so as to reduce the predicted pitching of the ship body.

11 Claims, 11 Drawing Sheets

SHIP ASSISTANCE DEVICE, SHIP ASSISTANCE METHOD, AND STORAGE MEDIUM

CROSS-REFERENCE TO RELATED APPLICATION

The application is based on Japanese Patent Application No. 2021-134934 filed on Aug. 20, 2021, the content of which incorporated herein by reference.

BACKGROUND

Field of the Invention

The present invention relates to a ship assistance device, a ship assistance method, and a storage medium.

Description of Related Art

The technology for alleviating the sway of a small ship is known. For example, Japanese Patent Application Laid-open No. 2004-291688 discloses a technology of controlling pitching of a ship body by using an angular velocity sensor.

The technology disclosed in Japanese Patent Application Laid-open No. 2004-291688 controls the speed of the ship body when a pitching angular velocity output by the angular velocity sensor exceeds a predetermined threshold value. However, the technology disclosed in Japanese Patent Application Laid-open No. 2004-291688 does not predict pitching of the ship body in advance, and is not preferable for assisting an occupant of the ship in driving the ship in some cases.

SUMMARY

The present invention has been made in view of the above-mentioned circumstances, and has an object to provide a ship assistance device, a ship assistance method, and a storage medium, which can provide driving assistance to the occupant of the ship more preferably.

A ship assistance device, a ship assistance method, and a storage medium according to embodiments of the present invention adopt the following configurations.

(1): According to an embodiment of the present invention, there is provided is a ship assistance device including a storage medium storing a computer-readable command and a processor connected to the storage medium, the processor executing the computer-readable command to: calculate a pitching amount of a ship body based on a plurality of images photographed by a camera mounted on the ship body; estimate a pitching cycle of the ship body at least based on the calculated pitching amount; predict pitching of the ship body based on the estimated pitching cycle; and control a throttle of the ship body so as to reduce the predicted pitching of the ship body.

(2): According to another aspect of the present invention, there is provided a ship assistance device comprising a storage medium storing a computer-readable command and a processor connected to the storage medium, the processor executing the computer-readable command to: calculate a pitching amount of a ship body based on a plurality of images photographed by a camera mounted on the ship body; estimate a pitching cycle of the ship body at least based on the calculated pitching amount; predict pitching of the ship body based on the estimated pitching cycle; and display such a throttle operation of the ship body as to reduce the predicted pitching of the ship body.

(3): In the aspect (1), the processor cuts out a plurality of square regions from an image photographed at a predetermined time by shifting predetermined pixels among the plurality of images, and calculates the pitching amount based on a plurality of shift amounts corresponding to the plurality of cut out square regions and a plurality of characteristic values of difference images between the plurality of cut out square regions and a reference region of an image photographed at a time subsequent to the predetermined time.

(4): In the aspect (3), the processor derives an approximation function that approximates a relationship between the plurality of shift amounts and the plurality of characteristic values, identifies a shift amount corresponding to the minimum value of the approximation function as a pitching variation amount, and integrates the pitching variation amount to calculate the pitching amount.

(5): In the aspect (1), the pitching cycle estimation unit estimates the pitching cycle by minimizing an evaluation function for evaluating an error between the pitching amount calculated by the pitching amount calculation unit and a pitching amount estimation model constructed based on a variable obtained by adding a vibrating reference signal to each of an angular velocity and phase of the pitching.

(6): In the aspect (1), the pitching prediction unit predicts the pitching of the ship body by advancing a phase of the pitching by a predetermined period from the estimated pitching cycle.

(7): According to another aspect of the present invention, there is provided a ship assistance method to be executed by a computer, including: calculating a pitching amount of a ship body based on a plurality of images photographed by a camera mounted on the ship body; estimating a pitching cycle of the ship body at least based on the calculated pitching amount; predicting pitching of the ship body based on the estimated pitching cycle; and controlling a throttle of the ship body so as to reduce the predicted pitching of the ship body.

(8): According to another aspect of the present invention, there is provided a computer-readable non-transitory storage medium storing a program for causing a computer to: calculate a pitching amount of a ship body based on a plurality of images photographed by a camera mounted on the ship body; estimate a pitching cycle of the ship body at least based on the calculated pitching amount; predict pitching of the ship body based on the estimated pitching cycle; and control a throttle of the ship body so as to reduce the predicted pitching of the ship body.

According to the aspects (1) to (8), it is possible to execute driving assistance for the occupant of the ship more preferably.

According to the aspect (4), it is possible to reduce the image processing load by utilizing the approximation function.

According to the aspect (5), it is possible to smoothly predict the pitching behavior by utilizing the pitching model having periodic behavior.

According to the aspect (6), it is possible to predict pitching in consideration of responsiveness the engine or occupant by advancing the phase of the estimated pitching cycle.

DESCRIPTION OF EMBODIMENTS

[Configuration of Vehicle]

Now, description is given of a ship assistance device, a ship assistance method, and a storage medium according to an embodiment of the present invention with reference to the drawings.

Figure 1:
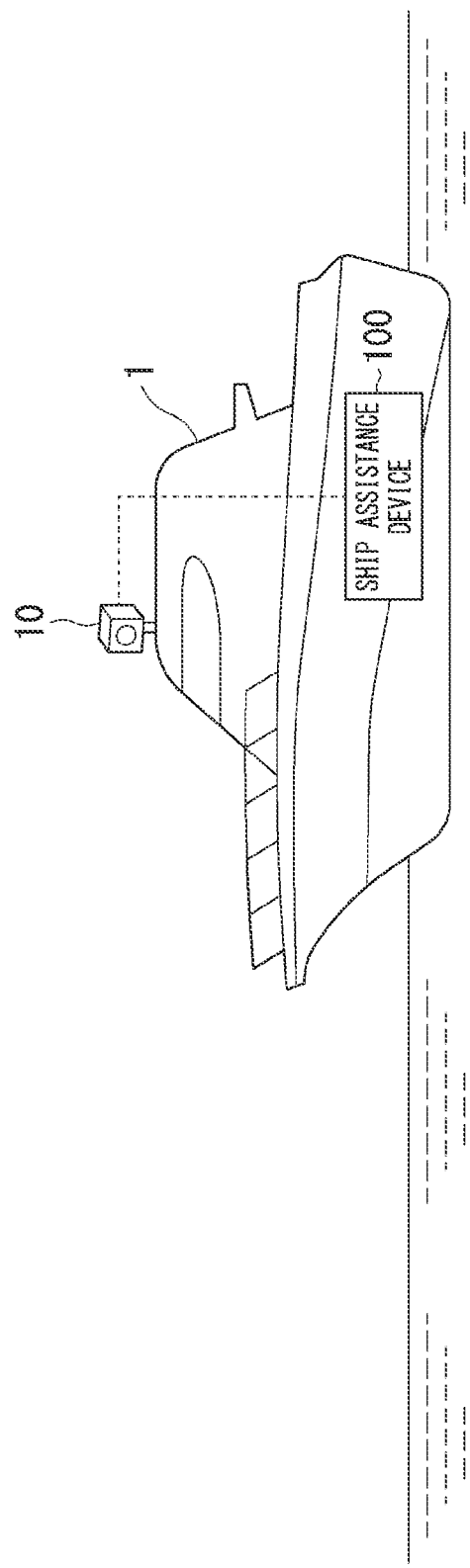
FIG. 1 is a diagram illustrating an example of a configuration of a ship in which a ship assistance device is mounted.

FIG. 1 is a diagram illustrating an example of a configuration of a ship 1 in which a ship assistance device 100 is mounted. The ship 1 is, for example, a cruiser, a yacht, or a boat. A camera 10 is mounted on the upper part of the ship 1, and the camera 10 repeatedly images the front field of the ship 1 sailing on the water at redetermined cycles. In particular, the bow of some ship 1 bends upward, and thus the camera 10 is preferably installed on the upper part of the cabin structure of the ship 1 so as to be capable of reliably imaging the front field of the ship 1. The image captured by the camera 10 is transmitted to the ship assistance device 100. The ship assistance device 100 is usually mounted in the ship 1, but may be installed at any position that enables communication with the camera 10.

Figure 2:
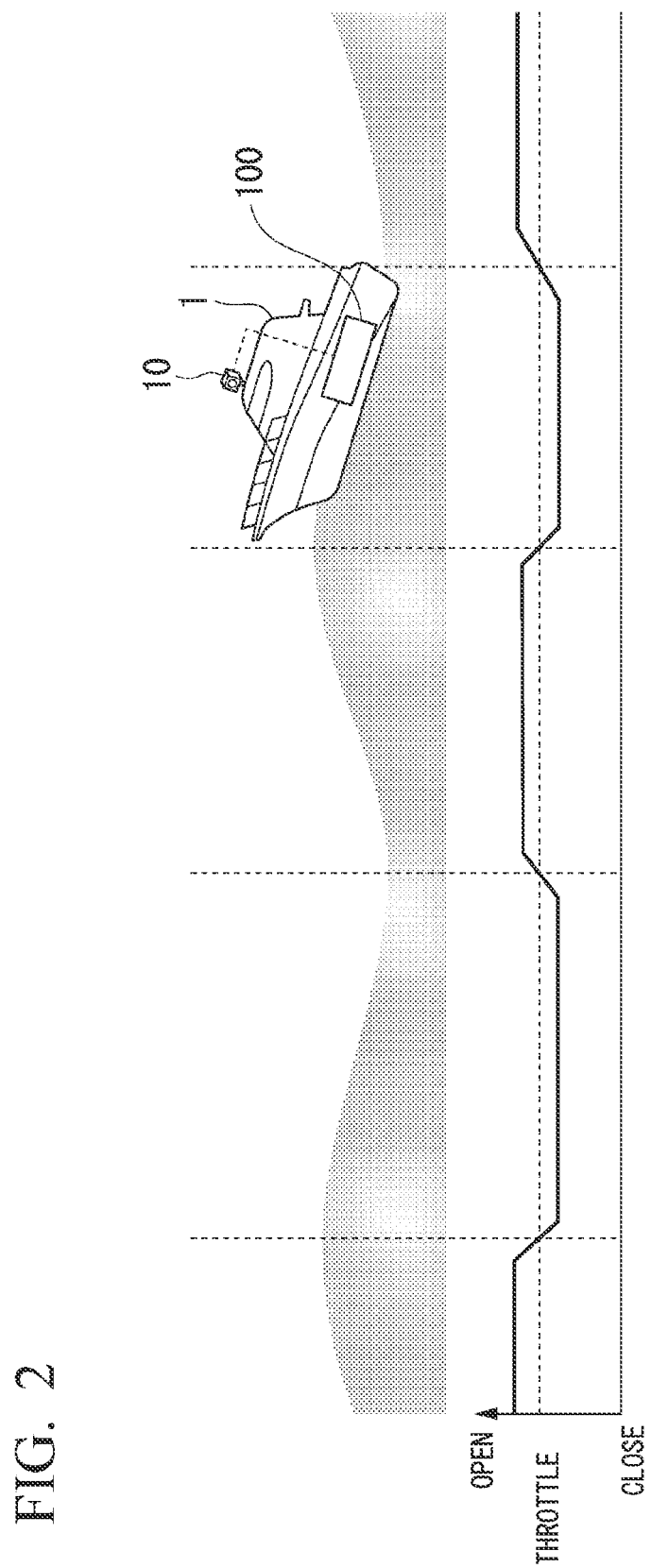
FIG. 2 is a diagram for describing an outline of an operation to be executed by the ship assistance device.

FIG. 2 is a diagram for describing an outline of an operation to be executed by the ship assistance device 100. When the ship 1 is sailing on the water, the ship body receives waves, so that bouncing, namely, pitching occurs. Pitching means rotation with respect to a direction orthogonal to the traveling direction and vertical direction of the ship. When the throttle opening degree of the ship 1 is maintained to a fixed value and no measure is taken to cope with the pitching, the pitching of the ship 1 becomes larger, and the occupant may feel sick or uncomfortable.

To address this issue, the ship assistance device 100 according to an embodiment decreases the throttle opening degree of the ship 1 when the pitching amount of the ship 1 increases (bow faces upward) and increases the throttle opening degree of the ship 1 when the pitching amount of the ship 1 decreases (bow faces downward), to thereby reduce the pitching of the ship 1. FIG. 2 shows the transition of the value of the throttle opening degree under such control. A skilled operator can reduce the pitching of the ship 1 by performing such a throttle operation, but not all the operators have such skills. Further, in order to manually perform such a throttle operation, the operator is always required to observe pitching, which may take time and effort. The ship assistance device 100 according to this embodiment predicts pitching of the ship 1 on the basis of the image captured by the camera 10, and automatically controls the throttle or assists the operator in manually operating the throttle on the basis of the result of prediction.

Figure 3:
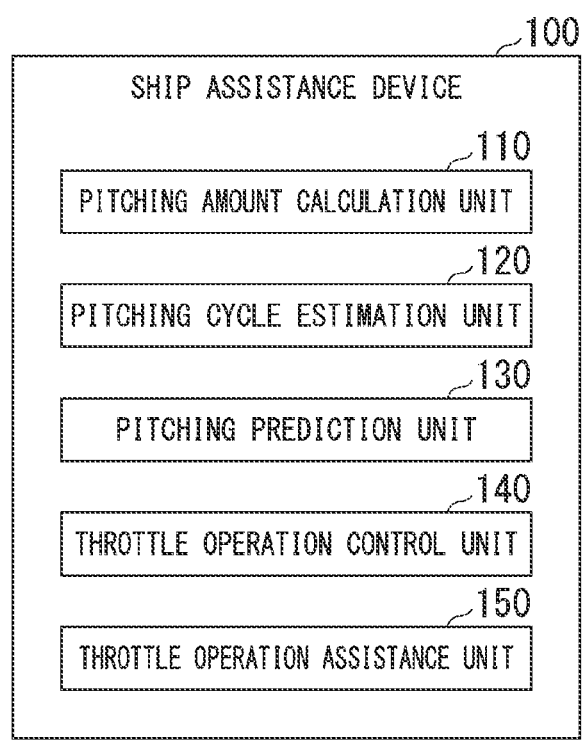
FIG. 3 is a diagram illustrating an example of the functional configuration of the ship assistance device.

FIG. 3 is a diagram illustrating an example of the functional configuration of the ship assistance device 100. The ship assistance device 100 includes, for example, a pitching amount calculation unit 110, a pitching cycle estimation unit 120, a pitching prediction unit 130, a throttle operation control unit 140, and a throttle operation assistance unit 150. The pitching amount calculation unit 110, the pitching cycle estimation unit 120, the pitching prediction unit 130, the throttle operation control unit 140, and the throttle operation assistance unit 150 are implemented by a hardware processor such as a CPU (Central Processing Unit) executing a program (software), for example. A part or all of these components may be implemented by hardware (circuit unit including circuitry) such as an LSI (Large Scale Integration), an ASIC (Application Specific Integrated Circuit), an FPGA (Field-Programmable Gate Array), or a GPU (Graphics Processing Unit), or may be implemented through cooperation between software and hardware. The program may be stored in a storage device (storage device including non-transitory storage medium) such as an HDD (Hard Disk Drive) or flash memory in advance, or may be stored in a removable storage medium (non-transitory storage medium) such as a DVD or CD-ROM and the storage medium may be attached to a drive device to install the program.

The pitching amount calculation unit 110 calculates the pitching amount of the ship 1 on the basis of a plurality of photographed images PI photographed by the camera 10 mounted in the ship 1. More specifically, the pitching amount calculation unit 110 first extracts a pitching determination image DI from each of the plurality of photographed images PI, and calculates the pitching amount on the basis of the extracted pitching determination images DI. Now, description is given of an operation to be executed by the pitching amount calculation unit 110 with reference to FIG. 4 to FIG. 6.

Figure 4:
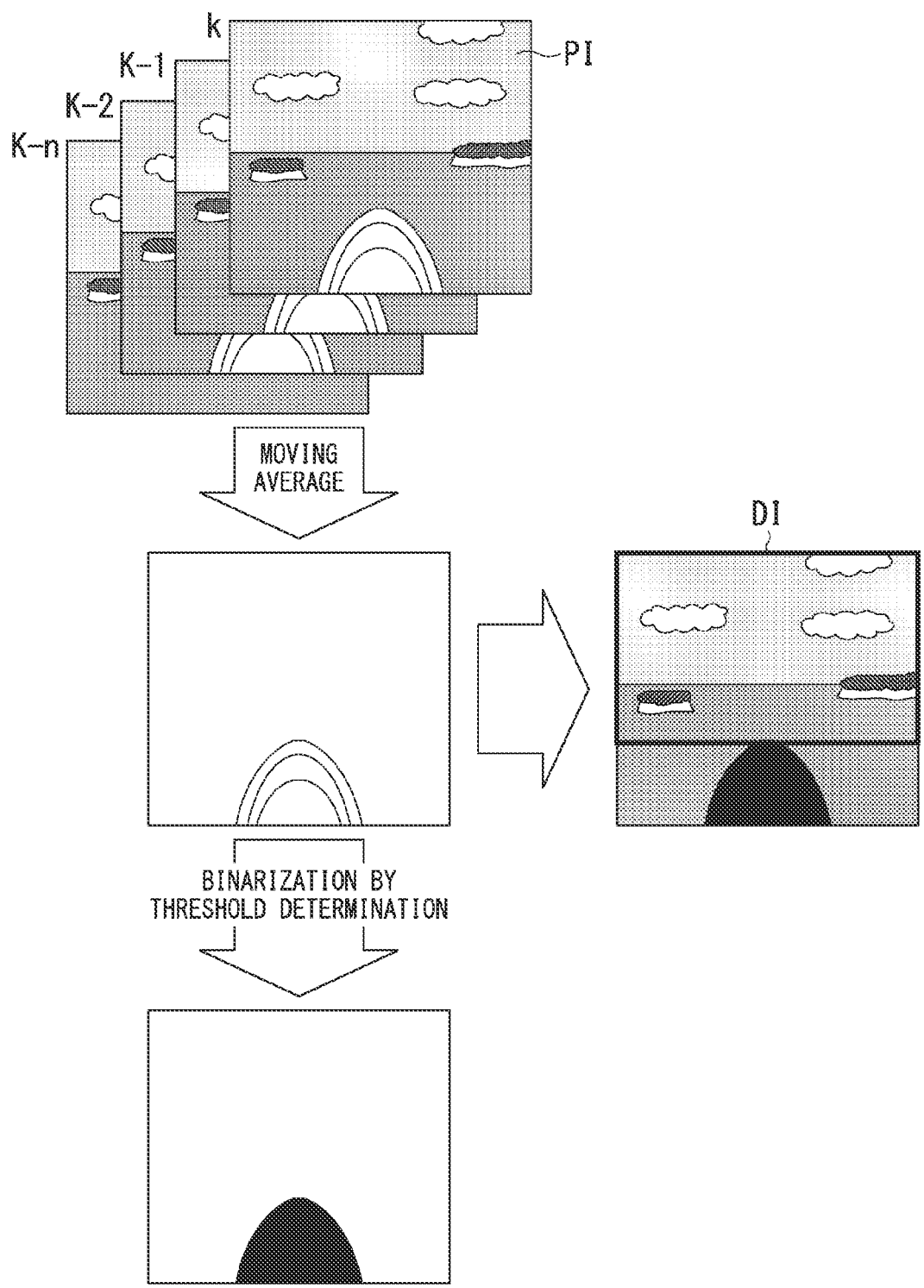
FIG. 4 is a diagram illustrating an example of a method of extracting a pitching determination image by a pitching amount calculation unit.

FIG. 4 is a diagram illustrating an example of a method of extracting the pitching determination image D by the pitching amount calculation unit 110. As illustrated in the upper left part of FIG. 4, the pitching amount calculation unit 110 first calculates a moving average of pixels (for example, RGB pixels) for the plurality of photographed images PI photographed by the camera 10 in time series. In the following, a control time at which each of the plurality of photographed images PI is input to the ship assistance device 100 is represented by control times k−n, . . . , k−2, k−1, k. k represents a current control time. The relative position of the ship body with respect to the camera 10 is fixed, and thus the pixels of a part corresponding to the ship body tend not to change, whereas the pixels of a part not corresponding to the ship body change in time in the photographed images PI, resulting in white by taking a moving average thereof.

Next, the pitching amount calculation unit 110 compares the moving average of pixels with a threshold value to obtain a binary value. The pitching amount calculation unit 110 identifies, as the ship body, a region having non-zero pixel values as a result of binarization. In this manner, as illustrated in the lower left part of FIG. 4, the pitching amount calculation unit 110 can identify the ship body of the ship 1. The pitching amount calculation unit 110 extracts, from among the plurality of photographed images PI, which are photographed in time series, square regions excluding the ship body of the ship 1 as the plurality of pitching determination images DI.

Next, the pitching amount calculation unit 110 cuts out a plurality of square regions SR from an image photographed at a predetermined time (for example, time k−i) by shifting predetermined pixels thereof among the plurality of pitching determination images DI, and calculates difference images between the plurality of cut out square regions SR and a reference region RR of an image photographed at a time (for example, time k) after the predetermined time.

Figure 5:
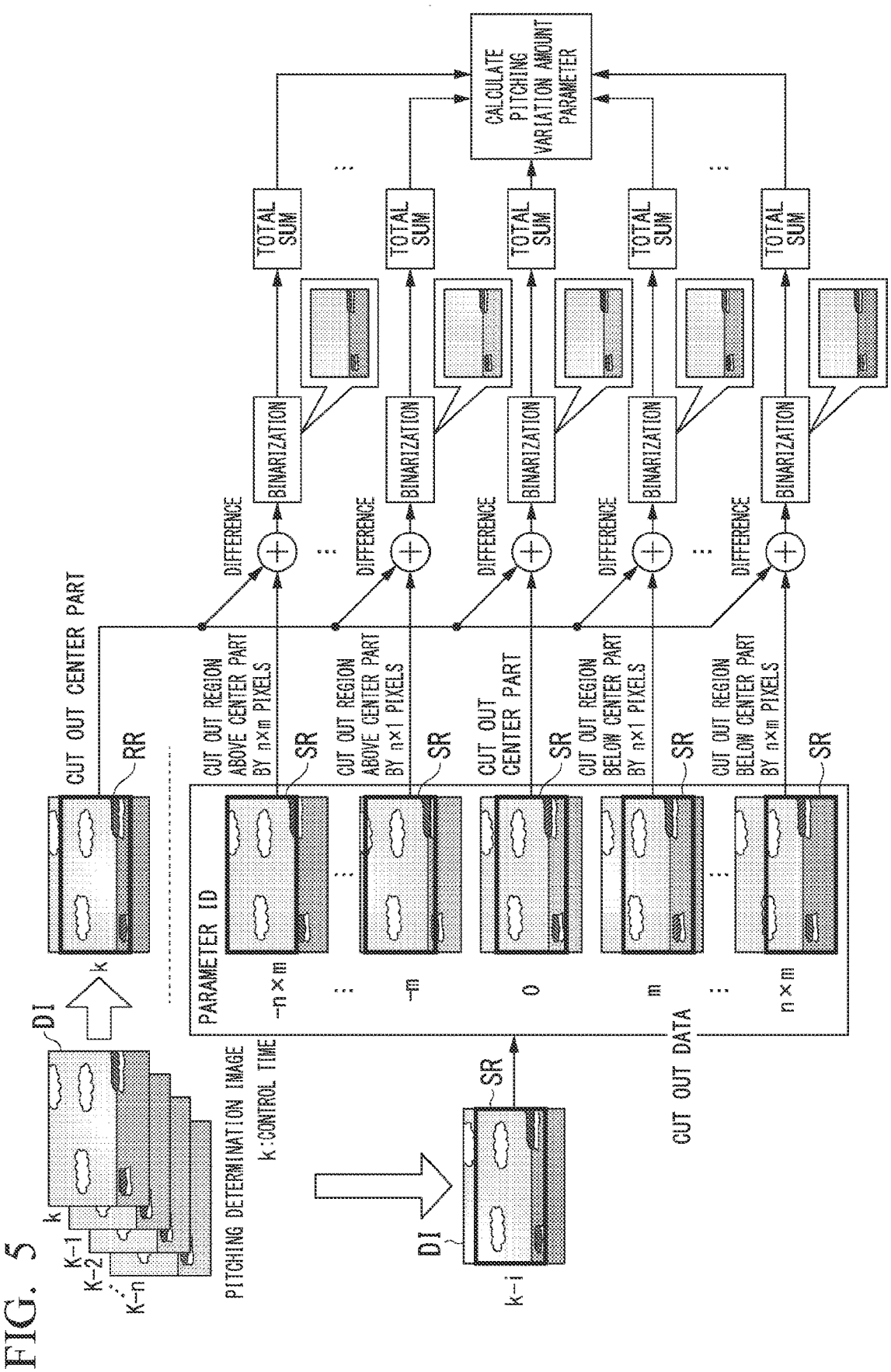
FIG. 5 is a diagram illustrating an example of a method of obtaining a difference image between a square region and a reference region by the pitching amount calculation unit.

FIG. 5 is a diagram illustrating an example of a method of obtaining a difference image between a square region SR and a reference region RR by the pitching amount calculation unit 110. As illustrated in FIG. 5, for example, the pitching amount calculation unit 110 uses a reference square region SR, which is obtained by cutting out the center part of the pitching determination image DI at a time point k−i, to cut out square regions SR, which are obtained by shifting the reference square region SR in an upper direction by (n×1) pixels, . . . , and (n×m) pixels, and shifting the reference square region SR in a lower direction by (n×1) pixels, . . . , and (n×m) pixels (n represents the number of horizontal pixels of the image DI, and m represents the maximum number of vertical pixels for shifting the square region SR, which matches the upper end or lower end of the image DI).

Next, the pitching amount calculation unit 110 obtains, as the reference region RR, a square region obtained by cutting out the center part of the pitching determination image DI at the current time point k. The pitching amount calculation unit 110 takes differences between the plurality of cut out square regions SR and the reference region RR, and binarizes the differences to obtain a plurality of difference images. At this time, a difference image having a higher degree of match with the reference region RR tends to exhibit a white color.

Next, the pitching amount calculation unit 110 calculates a total sum of absolute values of pixel values for each difference image. This total sum of absolute values of pixel values is an example of "characteristic value". The square region SR having the total sum of absolute values of pixel values means a square region having a difference with the reference region RR at the time point k. For example, when the total sum of absolute values of pixel values of the square region SR obtained by shifting the center part of the pitching determination image DI at the time point k−i in the upper (or lower) direction by (n×1) pixels is minimum, this means that pitching behavior has occurred in the upper (or lower) direction by a distance corresponding to one pixel in a period between the time point k−i and the time point k. Thus, the pitching amount calculation unit 110 can identify, as the pitching variation amount dp, a length corresponding to the shift amount of the square region SR having the minimum total sum of absolute values of pixel values (technique 1).

However, when the pitching variation amount dp is obtained by the above-mentioned technique 1, it is necessary to set the shift amount of the square region SR finely in order to identify the square region SR having the minimum total sum of absolute values of pixel values. As a result, the number of square regions SR to be cut out from the pitching determination image DI and subject to the processing of taking a difference with the reference region RR increases, which may increase the load of image processing excessively. Thus, in this embodiment, the pitching amount calculation unit 110 derives an approximation function that approximates a relationship between a plurality of shift amounts and a plurality of the total sums of absolute values of pixel values, and identifies a shift amount corresponding to the minimum value of the approximation function as the pitching variation amount dp.

More specifically, the pitching amount calculation unit 110 first approximates an estimated value $S^\wedge$ ($^\wedge$ (hat) to be originally assigned above S is denoted by $S^\wedge$) of the total sum of absolute values of pixel values in accordance with the following expression (1) by using an approximation function F being a quadratic function for the shift amount xp(j).

$$S^\wedge(j)=F(xp(j))=a(j)xp2(j)+b(j)xp(j)+c(j)=\Phi T(j)\zeta(j) \quad \text{Expression (1)}$$

In expression (1), a(j), b(j), c(j) represent approximation function parameters of the approximation function F, and $\Phi(j)$ and $\zeta(j)$ are vectors defined by the following expressions (2) and (3), respectively. j represents an approximation function calculation counter, and increases by the number of parameter IDs of the square regions SR shifted in FIG. 5 at the control time point k.

$$\zeta T(j)=[xp2(j), xp(j), 1] \quad \text{Expression (2)}$$

$$\Phi T(j)=[a(j), b(j), 1] \quad \text{Expression (3)}$$

That is, when the approximation function parameters a(j), b(j), c(j) of the approximation function F are obtained, the shift amount corresponding to the minimum value of the approximation function F can be identified as the pitching variation amount dp. In this embodiment, the pitching amount calculation unit 110 uses data of the plurality of shift amounts and the plurality of the total sums of absolute values of pixel values obtained in FIG. 5 to obtain the approximation function parameters a(j), b(j), c(j) by an iterative least square technique in accordance with the following expressions (4), (5), (6).

$$e(j)=S(j)-S^\wedge(j)=S(j)-\Phi T(j)\zeta(j) \quad \text{Expression (4)}$$

$$\Phi(j)=\Phi(j-1)+KG(j)e(j) \quad \text{Expression (5)}$$

$$KG(j)=G\zeta(j)/\{1+\zeta T(j)G\zeta(j)\} \quad \text{Expression (6)}$$

In expression (4), e(j) represents an error between the total sum S(j) of pixel values and the estimated value $S^\wedge(j)$ of the total sum of pixel values, and in expressions (5) and (6), KG(j) represents an update gain of the error e(j). KG(j) corresponds to the gradient of an error curved surface, and is obtained by taking a partial derivative of the error curved surface by a(j), b(j), c(j).

The pitching amount calculation unit 110 substitutes the shift amount of the square region SR of each parameter ID into xp(j) in order at each control time point k, substitutes the total sum of pixel values corresponding to the shift amount into S(j), and minimizes a square error between the total sum S(j) of pixel values and the estimated value $S^\wedge(j)$ of the total sum of pixel values in accordance with the expressions (4), (5), (6), to thereby obtain the approximation function parameters a(j), b(j), c(j). In this manner, it is possible to derive the approximation function F.

Figure 6:
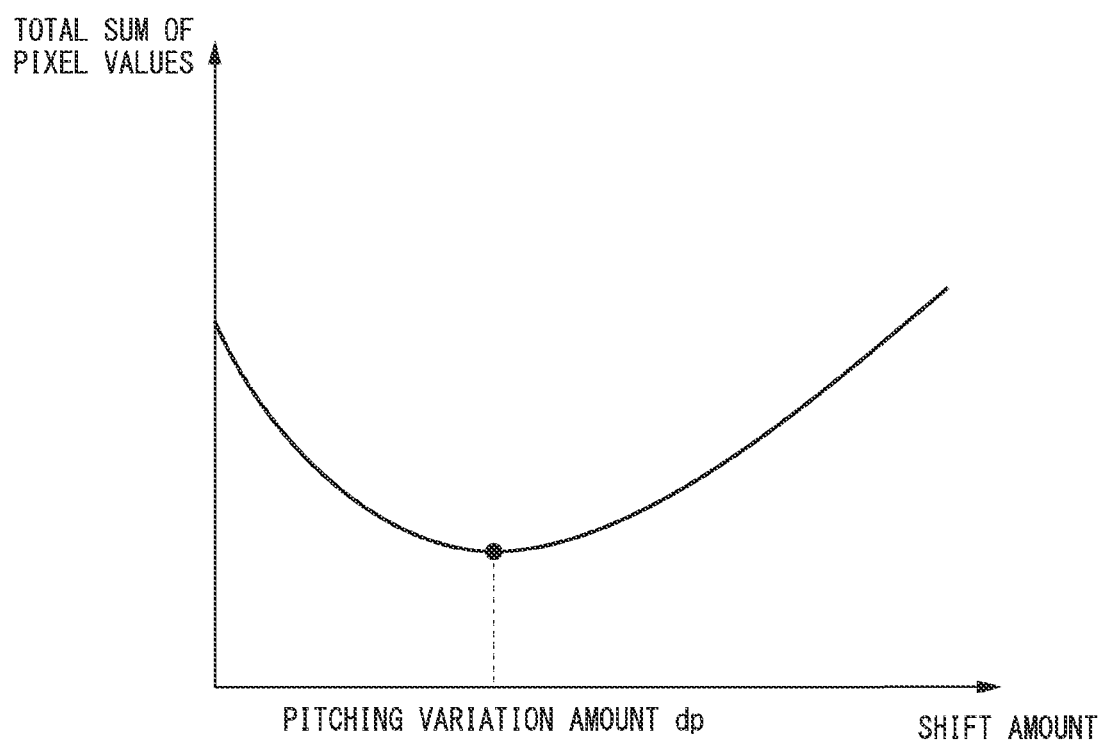
FIG. 6 is a diagram illustrating an example of an approximation function calculated by the pitching amount calculation unit.

FIG. 6 is a diagram illustrating an example of the approximation function F calculated by the pitching amount calculation unit 110. The pitching amount calculation unit 110 identifies, as the pitching variation amount dp, the shift amount corresponding to the calculated minimum value of the approximation function F. More specifically, the pitching amount calculation unit 110 identifies the pitching variation amount dp in accordance with expression (7).

$$dp(j)=-b(j)/2a(j) \qquad \text{Expression (7)}$$

Calculation of dp(j) is performed in shorter cycles at the control time k. Thus, the pitching amount calculation unit 110 identifies the final value of dp(j) calculated at the control time k as the pitching variation amount (pitching variation amount parameter) dp(k) at the control time k. In this manner, contrary to the technique 1 in which the shift amount of the square region SR is required to be set finely, in this embodiment, the approximation function F is calculated by the iterative least square technique on the basis of data of the plurality of shift amounts and the plurality of the total sums of absolute values of pixel values obtained in FIG. 5, to thereby identify the pitching variation amount dp(k). As a result, it is possible to reduce the load of image processing compared to the technique 1.

After the pitching amount calculation unit 110 calculates the pitching variation amount dp(k), the pitching amount calculation unit 110 integrates the pitching variation amount dp(k) in accordance with the following expression (8) or (9) to calculate a pitching amount parameter p(k).

$$p(k)=p(k-1)+dp(k) \qquad \text{Expression (8)}$$

$$p(k)=\lambda p p(k-1)+dp(k) \qquad \text{Expression (9)}$$

In expression (9), $\lambda p$ represents a forgetting coefficient of the pitching variation amount p(k), and is, for example, a value smaller than 1 such as 0.99. By using expression (9) instead of expression (8), it is possible to prevent drift of the central value of the pitching variation amount dp(k) and divergence of the absolute value due to the influence of an error.

After the pitching amount calculation unit 110 calculates the pitching variation amount p(k), the pitching cycle estimation unit 120 estimates the pitching cycle of the ship body of the ship 1 on the basis of the calculated pitching amount parameter p(k). More specifically, the pitching cycle estimation unit 120 assumes that the pitching behavior of the ship body follows a sine wave, and estimates an amplitude ψ, an angular velocity parameter ω, and a phase η for defining the sine wave.

Figure 7:
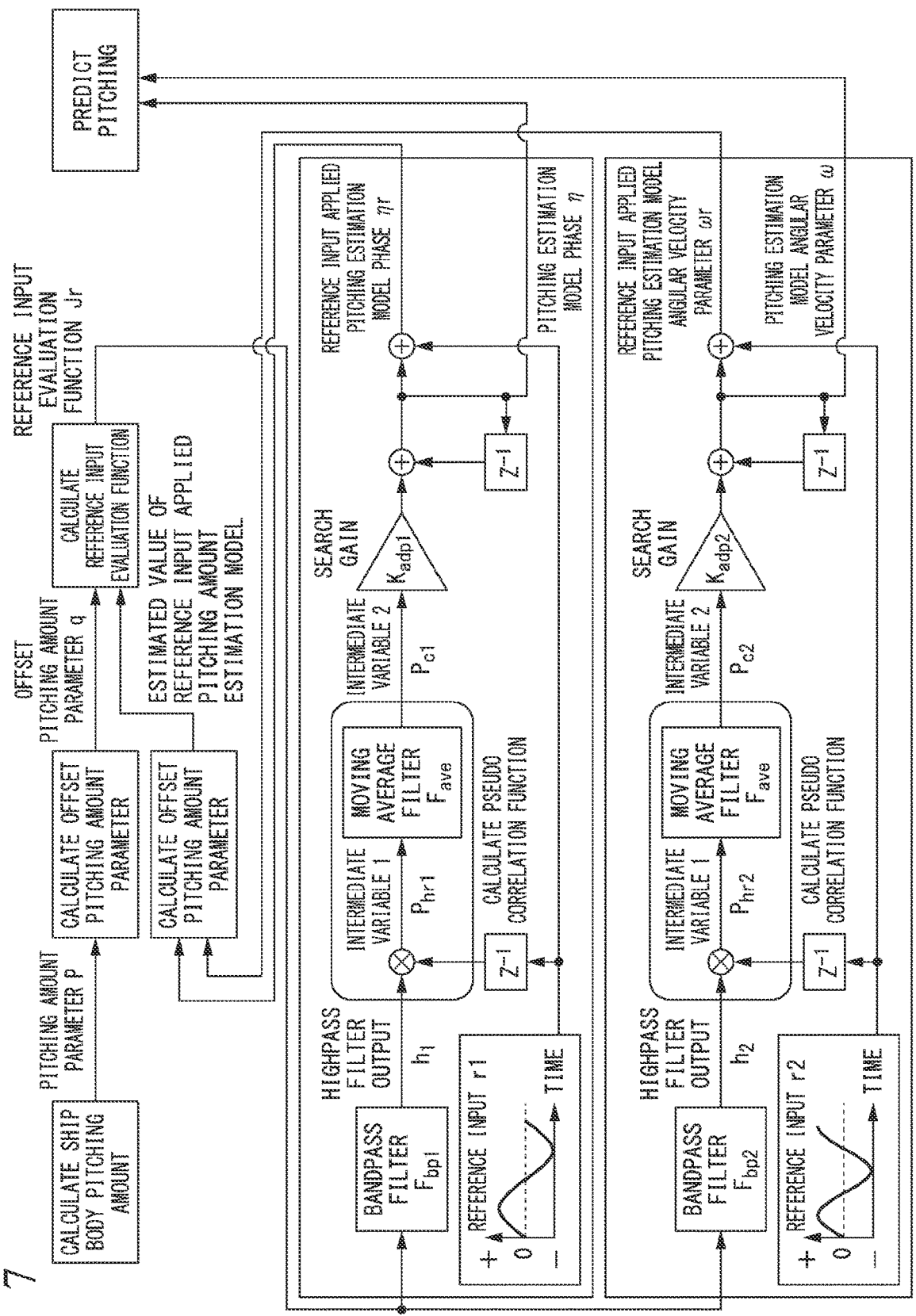
FIG. 7 is a diagram illustrating an example of a flow of estimating a pitching cycle by a pitching cycle estimation unit.

FIG. 7 is a diagram illustrating an example of a flow of estimating the pitching cycle by the pitching cycle estimation unit 120. The pitching cycle estimation unit 120 first defines the offset pitching amount parameter q(k) in accordance with the following expressions (10) and (11) on the basis of the calculated pitching amount parameter p(k).

[Math. 1]

$$p\_ave(k) = \frac{1}{ma+1} \sum_{ia=0}^{ma} p(k-ia) \qquad \text{Expression (10)}$$

$$q(k) = p(k) - p\_ave(k) \qquad \text{Expression (11)}$$

In expressions (10) and (11), p_ave(k) represents a moving average value of the pitching amount parameter p(k), and ma represents a moving average number for calculating p_ave(k). The pitching cycle estimation unit 120 defines the estimated amplitude value ψ(k) in accordance with the following expressions (12) and (13) on the basis of the calculated offset pitching amount parameter q(k).

[Math. 2]

$$\sigma(k) = \sqrt{\frac{1}{ms+1} \sum_{is=0}^{ms} q^2(k-is)} \qquad \text{Expression (12)}$$

$$\psi(k) = Kamp\sigma(k) \qquad \text{Expression (13)}$$

In expressions (12) and (13), σ(k) represents a standard deviation of q(k), ms represents a moving average number for calculating σ(k) (ms<ma), and Kamp represents an adaptive parameter of the estimated amplitude value ψ(k). The pitching cycle estimation unit 120 defines the estimated value q^ of a pitching amount estimation model for estimating the offset pitching amount parameter q(k) in accordance with expression (14).

$$q\hat{\,}(k)=\psi(k)\sin(\Omega(k)+\eta(k)) \qquad \text{Expression (14)}$$

In expression (14), Ω(k) represents an angular velocity parameter of the pitching amount estimation model, and η(k) represents the phase of the pitching amount estimation model. Further, Ω(k) is defined by the following expression (15).

[Math. 3]

$$\Omega(k) = \qquad \text{Expression (15)}$$
$$\begin{cases} \Omega(k-1) + \omega(k)\Delta T & (0 \le \Omega(k-1) + \omega(k)\Delta Tk < 2\pi) \\ 2\pi & (2\pi \le \Omega(k-1) + \omega(k)\Delta Tk) \end{cases}$$

In expression (15), ω(k) represents a gain of the angular velocity parameter, and ΔT represents the period of the control time k. The pitching cycle estimation unit 120 calculates the amplitude ψ(k) of the estimated value q^ of the pitching amount estimation model in accordance with expression (13), and calculates the phase η(k) and the angular velocity Ω(k) of the estimated value q^ of the pitching amount estimation model by minimizing an evaluation function J defined by the following expressions (16) and (17).

$$e\_m(k)=q(k)-q\hat{\,}(k) \qquad \text{Expression (16)}$$

$$J(k)=\lambda m J(k)+e\_m(k)2 \qquad \text{Expression (17)}$$

In expressions (16) and (17), e_m represents a model error of the pitching amount estimation model, and λm represents a forgetting coefficient of the evaluation function J(k) (0≤λm≤1).

In order to optimize the evaluation function J by the extremum seeking controller, the pitching cycle estimation unit 120 defines the following variables, which are obtained by adding reference inputs r1 and r2 to the phase η and angular velocity parameter gain ω of the pitching amount estimation model, in accordance with the following expressions (18), (19), (20), and (21).

$$\eta r(k)=\eta(k)+r1(k) \qquad \text{Expression (18)}$$

$$r1(k)=Ar1\ \sin(\omega r1 \Delta Tk) \qquad \text{Expression (19)}$$

$$\omega r(k)=\omega(k)+r2(k) \qquad \text{Expression (20)}$$

$$r2(k)=Ar2\ \sin(\omega r2 \Delta Tk) \qquad \text{Expression (21)}$$

In expressions (18), (19), (20), and (21), ηr represents a reference input applied phase, r1 represents a reference input to the phase η, ωr represents a reference input applied angular velocity parameter, Ar1 represents the amplitude of the reference input to the phase η, ωr1 represents an angular velocity frequency of the reference input to the phase η, r2 represents the reference input to the angular velocity parameter gain ω, ωr2 represents the amplitude of the reference input to the angular velocity parameter gain ω, and ωr2 represents the angular velocity frequency of the reference input to the angular velocity parameter gain ω. In the above expressions, ωr1 and ωr2 are relatively prime.

The reference input applied phase ηr represented by expression (18) and the reference input applied angular velocity parameter tor represented by expression (20) are used to redefine the evaluation function J as the evaluation function Jr in accordance with expressions (22), (23), (24), and (25). The reference input is a periodic function having an average value of zero, and thus minimization of the evaluation function J and minimization of the evaluation function Jr are equivalent to each other.

$$q\hat{\,}r(k)=\psi(k)\sin(\Omega r(k)+\eta r(k)) \quad \text{Expression (22)}$$

$$\Omega r(k)=\Omega(k-1)+\omega r(k)\Delta T \quad \text{Expression (23)}$$

$$e\_mr(k)=q(k)-q\hat{\,}\_r(k) \quad \text{Expression (24)}$$

$$Jr(k)=\lambda mJ(k)+e\_mr(k)2 \quad \text{Expression (25)}$$

In expressions (22), (23), (24), and (25), q^r represents the estimated value of the reference input applied pitching amount estimation model, Ωr represents the angular velocity parameter of the reference input applied pitching estimation model, e_mr represents the error of the reference input applied pitching estimation model, and Jr represents the reference input applied evaluation function.

The pitching cycle estimation unit 120 uses the reference input applied evaluation function Jr defined above to optimize the reference input applied phase ηr and the reference input applied angular velocity parameter ωr by the extremum seeking controller.

As illustrated in FIG. 7, the pitching cycle estimation unit 120 inputs the reference input applied evaluation function Jr to a bandpass filter Fbp1 to extract a vibrational component of the reference input applied evaluation function Jr. The extracted vibrational component h1(k) is represented by the following expression (26), for example $$h1(k)=Fbp1(Jr(k)) \quad \text{Expression (26)}$$

Next, the pitching cycle estimation unit 120 multiplies the output value h1(k) of the bandpass filter Fbp1 by the reference signal r1 to obtain an intermediate variable Phr1. This intermediate variable Phr1 represents the period or increase/decrease sensitivity of the vibrational component h1(k) with respect to the period of the reference signal r1. The intermediate variable Phr1 is represented by the following expression (27).

$$Phr1(k)=h1(k)r1(k-1) \quad \text{Expression (27)}$$

The intermediate variable Phr1 obtained by multiplication processing includes a vibrational component due to the reference signal r1. Thus, the pitching cycle estimation unit 120 removes the vibrational component by inputting the intermediate variable Phr1 into a moving average filter Fave in accordance with the following expression (28).

[Math. 4]

$$P_{c1}(k) = \frac{1}{mc+1}\sum_{ic=0}^{mc} P_{hr1}(ic) \quad \text{Expression (28)}$$

In expression (28), mc represents the number of moving average taps, and is set to a value Ts/ΔT1 obtained by dividing Ts, which is a multiple of the period T1 of ω1, by a control period ΔT. The pitching cycle estimation unit 120 obtains an intermediate variable Pc1(k) by the processing of expression (28).

Next, the pitching cycle estimation unit 120 multiplies the intermediate variable Pc1(k) by a search gain Ksk1, and adds the multiplied value to the previously estimated phase η(k) to calculate the current phase η(k). That is, the current phase η(k) is represented by the following expression (29).

$$\eta(k)=\eta(k)+Kadp1Pc1(k) \quad \text{Expression (29)}$$

The pitching cycle estimation unit 120 repeats the above-mentioned processing until the phase η(k) converges. The pitching cycle estimation unit 120 obtains the phase η(k) that has converged as the phase η(k) of the estimated value q^ of the pitching amount estimation model.

Similarly to the angular velocity parameter ω, the pitching cycle estimation unit 120 inputs the reference input applied evaluation function Jr into a bandpass filter Fbp2 to extract a vibrational component of the reference input applied evaluation function Jr. The extracted vibrational component h2(k) is represented by the following expression (30), for example.

$$h2(k)=Fbp2(Jr(k)) \quad \text{Expression (30)}$$

Next, the pitching cycle estimation unit 120 multiplies the output value h2(k) of the bandpass filter Fbp2 by a reference signal r2 to obtain an intermediate variable Phr2. This intermediate variable Phr2 represents the period or increase/decrease sensitivity of the vibrational component h2(k) with respect to the period of the reference signal r2. The intermediate variable Phr2 is represented by the following expression (31).

$$Phr2(k)=h2(k)r2(k-1) \quad \text{Expression (31)}$$

The intermediate variable Phr2 obtained by the multiplication processing includes a vibrational component due to the reference signal r2. Thus, the pitching cycle estimation unit 120 inputs the intermediate variable Phr2 into the moving average filter Fave to remove the vibrational component in accordance with the following expression (32).

[Math. 5]

$$P_{c2}(k) = \frac{1}{mc+1}\sum_{ic=0}^{mc} P_{hr2}(ic) \quad \text{Expression (32)}$$

In Expression (32), mc is set to a value Ts/ΔT2 obtained by dividing Ts, which is a multiple of the period T2 of ω2, by the control period ΔT. The pitching cycle estimation unit 120 obtains the intermediate variable Pc2(k) by the processing of expression (32).

Next, the pitching cycle estimation unit 120 multiplies the intermediate variable Pc2(k) by the search gain Ksk2, and adds the multiplied value to the previously estimated angular velocity parameter ω(k) to calculate the current angular velocity parameter ω(k). That is, the current angular velocity parameter ω(k) is represented by the following expression (33).

$$\omega(k)=\omega(k)+Kadp2Pc2(k) \quad \text{Expression (33)}$$

The pitching cycle estimation unit 120 repeats the above-mentioned processing until the angular velocity parameter ω(k) converges. The pitching cycle estimation unit 120 obtains the angular velocity parameter ω(k) that has converged as the angular velocity parameter ω(k) of the estimated value q^ of the pitching amount estimation model. In this manner, the pitching cycle estimation unit 120 obtains the amplitude ψ(k), the phase η(k), and the angular velocity Ω(k) of the estimated value q^ of the pitching amount estimation model.

The pitching prediction unit 130 predicts the pitching behavior of the ship body of the ship 1 on the basis of the estimated pitching cycle. More specifically, the pitching prediction unit 130 sets a prediction period Tpre in consideration of the responsiveness or the like of an engine based on the ship speed Vs, and advances the estimated value q^ of the pitching amount estimation model by the prediction period Tpre, to thereby predict the pitching behavior. That is, the predicted value q_pre of the pitching behavior is represented by the following expressions (34), (35), and (36).

$$\eta pre(k)=Tpre\omega(k)/2\pi \quad \text{Expression (34)}$$

$$\Omega pre(j)=\Omega(k)+\eta(k)+\eta pre(k) \quad \text{Expression (35)}$$

$$q\_pre(j)=\psi(k)\sin(\Omega pre(k)) \quad \text{Expression (36)}$$

In the expressions (34), (35), and (36), ηpre represents a pitching prediction phase, Tpre represents the pitching prediction period, and Ωpre represents the predicted phase parameter. Ω(k) is defined by expression (15).

Figure 8:
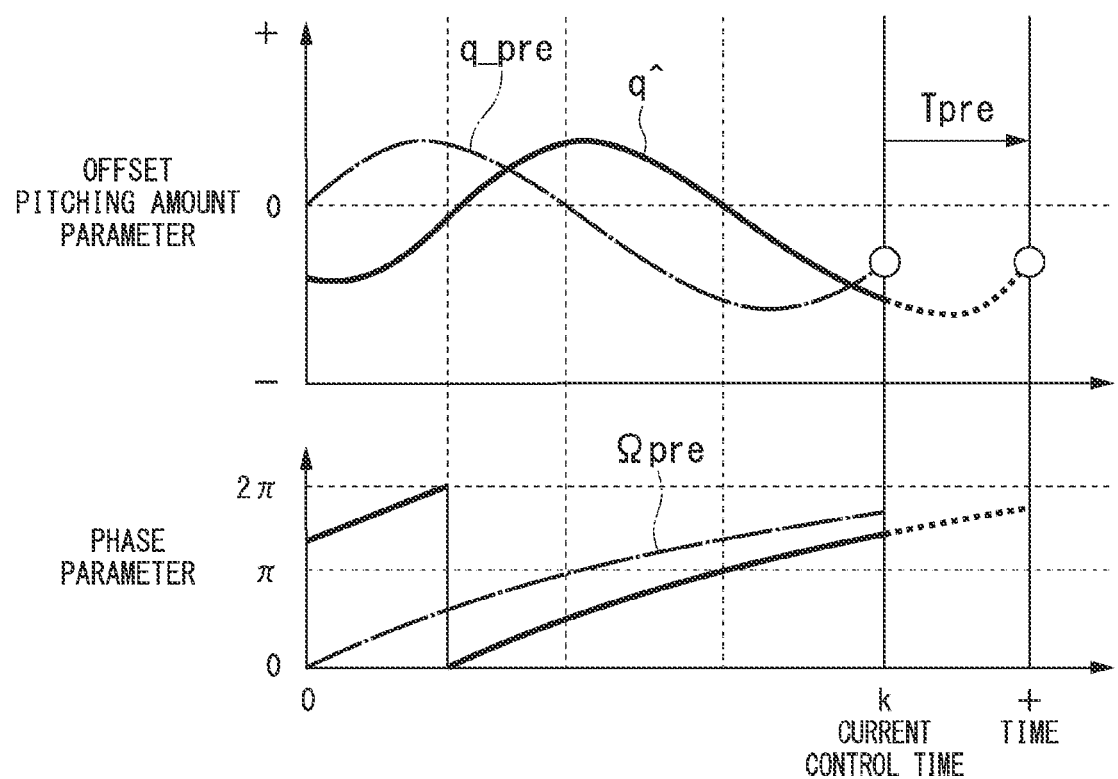
FIG. 8 is a graph showing an example of a predicted value of pitching behavior predicted by a pitching prediction unit.

FIG. 8 is a graph showing an example of the predicted value q_pre of the pitching behavior predicted by the pitching prediction unit 130. As illustrated in FIG. 8, the pitching prediction unit 130 advances the estimated value q^ of the pitching amount estimation model by the prediction period Tpre, to thereby be capable of performing automatic throttle control that considers responsiveness or the like of the engine or support of a throttle operation that considers responsiveness or the like of an occupant. For example, even when the current estimated value q^ of the pitching amount is decreasing, it is possible to predict increase of the pitching amount after elapse of Tpre by referring to the predicted value q_pre of the pitching behavior.

The throttle operation control unit 140 controls the throttle of the ship body so as to reduce the pitching behavior of the ship body on the basis of the predicted value q_pre of the pitching behavior predicted by the pitching prediction unit 130. More specifically, the throttle operation control unit 140 determines a throttle opening degree TH(k) in accordance with the following expression (37).

$$TH(k)=TH\_base(k)+DTH\_FB(k)+K\_DTH\_Comp(k)\\DTH\_Comp\_bs(k) \quad \text{Expression (37)}$$

In expression (37), TH_base(k) represents a reference throttle opening degree based on the target ship speed Vs_trgt(k), DTH_FB(k) represents a correction amount calculated to cause a feedback controller to control the ship speed Vs(k) to reach the target ship speed Vs_trgt(k), K_DTH_Comp(k) represents a compensation gain based on the estimated amplitude value ψ, and DTH_Comp_bs(k) represents a reference compensation pattern based on the predicted phase parameter Ωpre.

Figure 9:
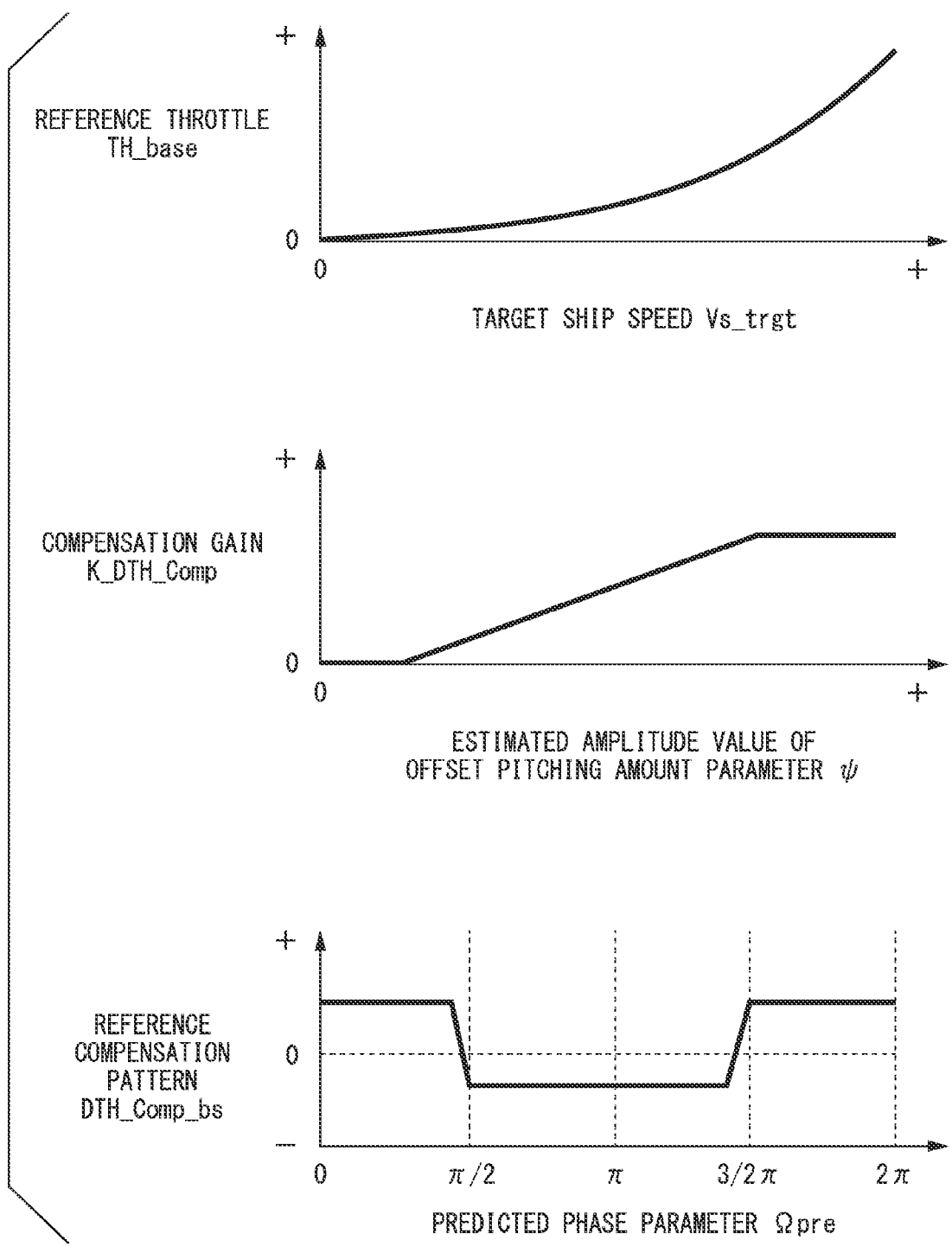
FIG. 9 is a diagram illustrating an example of a correspondence relationship to be referred to by a throttle operation control unit to determine a throttle opening degree.

FIG. 9 is a diagram illustrating an example of a correspondence relationship to be referred to by the throttle operation control unit 140 to determine the throttle opening TH(k). As illustrated in FIG. 9, the throttle operation control unit 140 sets the reference throttle opening degree TH_base(k) larger as the target ship speed Vs_trgt(k) becomes higher, and sets the compensation gain K_DTH_Comp(k) larger as the estimated amplitude value ψ becomes larger. Besides, the throttle operation control unit 140 sets the reference compensation pattern DTH_Comp_bs(k) smaller when the predicted phase parameter Ωpre falls within the range of π/2≤Ωpre(k)<3/2π, or sets the reference compensation pattern DTH_Comp_bs(k) larger when the predicted phase parameter Ωpre falls within the range of Ωpre(k)<π or 3/2π≤Ωpre(k).

The throttle operation assistance unit 150 assists in performing such a throttle operation as to reduce the pitching behavior of the ship body on the basis of the predicted value q_pre of the pitching behavior predicted by the pitching prediction unit 130. The throttle operation control unit 140 operates when the ship 1 is in an automatic operation mode, whereas the throttle operation assistance unit 150 operates when the ship 1 is in a manual operation mode.

The throttle operation assistance unit 150 may assist in performing a throttle operation by adding a compensation throttle opening degree to a throttle opening degree TH_user (k) indicated by the occupant in accordance with the following expression (38), for example.

$$TH(k)=TH\_user(k)+K\_DTH\_Comp(k)DTH\_Comp\_bs(k) \quad \text{Expression (38)}$$

Similarly to expression (37), in expression (38), DTH_Comp_bs(k) represents a reference compensation pattern, and K_DTH_Comp(k) represents a compensation gain. As a result, the throttle operation assistance unit 150 can reduce the pitching behavior depending on the throttle opening degree TH_user(k) indicated by the occupant.

Figure 10:
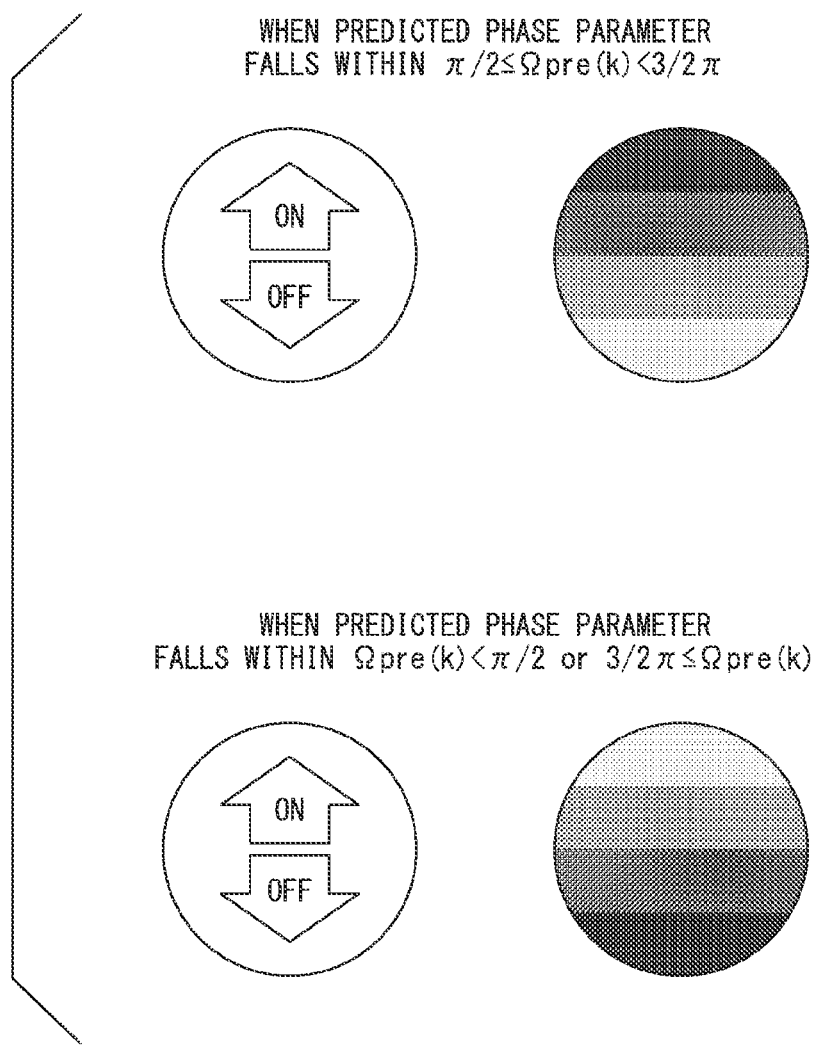
FIG. 10 is a diagram illustrating an example of indication information on a throttle operation displayed by a throttle operation assistance unit.

Further, the throttle operation assistance unit 150 may display indication information on such a throttle operation as to reduce the pitching behavior on a display unit (not shown) provide in the ship assistance device 100 without adding a compensation throttle opening degree. FIG. 10 is a diagram illustrating an example of indication information on a throttle operation displayed by the throttle operation assistance unit 150. As illustrated in the upper part of FIG. 10, the predicted value q_pre of the pitching behavior tends to decrease as indicated by FIG. 8 when the predicted phase parameter pre falls within the range of π/2≤Ωpre(k)<3/2π. Thus, the throttle operation assistance unit 150 displays the ON side of the throttle in a darker mode to recommend opening of the throttle. On the other hand, the predicted value q_pre of the pitching behavior tends to increase as indicated by FIG. 8 when the predicted phase parameter Ωpre falls within the range of Ωpre(k)<π/2 or 3/2π≤Ωpre(k). Thus, the throttle operation assistance unit 150 displays the OFF side of the throttle in a darker mode to recommend closing of the throttle. In this manner, the throttle operation assistance unit 150 can provide the occupant with indication information on a throttle operation for reducing the pitching behavior of the ship body.

Figure 11:
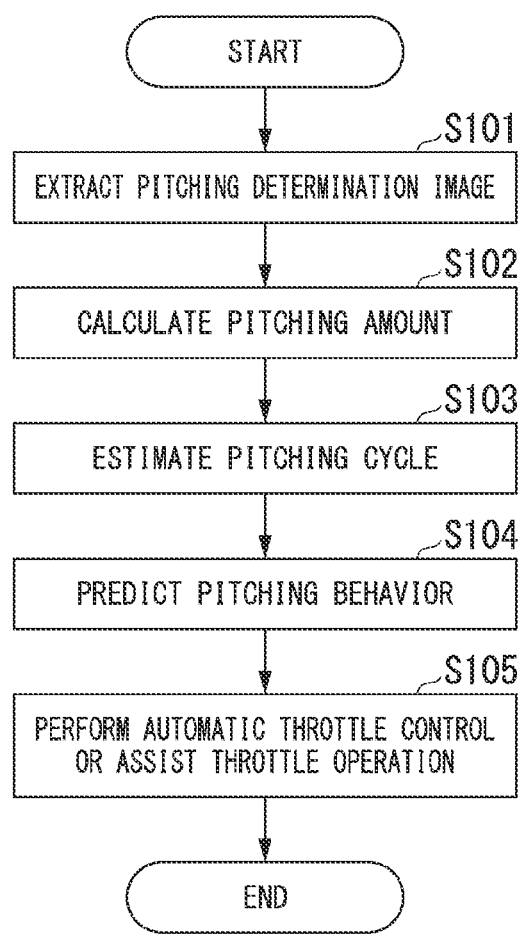
FIG. 11 is a flow chart illustrating an example of a flow of processing to be executed by the ship assistance device.

Next, description is given of a flow of processing to be executed by the ship assistance device 100 with reference to FIG. 11. FIG. 11 is a flow chart illustrating an example of a flow of processing to be executed by the ship assistance device 100.

First, the pitching amount calculation unit 110 identifies the ship body of the ship 1 on the basis of the plurality of photographed images PI photographed by the camera 10 mounted in the ship 1 in time series, and acquires a pitching determination image DI excluding the ship body from the photographed images PI (Step S101). Next, the pitching amount calculation unit 110 calculates a pitching amount on the basis of the plurality of pitching determination images DI (Step S102).

Next, the pitching cycle estimation unit 120 estimates the pitching cycle, namely, the amplitude, angular velocity, and phase of pitching on the basis of the pitching amount calculated by the pitching amount calculation unit 110 (Step S103). Next, the pitching prediction unit 130 predicts pitching behavior on the basis of the pitching cycle estimated by the pitching cycle estimation unit 120 (Step S104).

Next, the throttle operation control unit 140 controls the throttle of the ship body so as to reduce the pitching behavior on the basis of the pitching behavior predicted by the pitching prediction unit 130 (Step S105). Alternatively, when the occupant is manually operating the throttle, the throttle operation assistance unit 150 adds such a compensation throttle opening degree as to reduce the pitching behavior, or displays, on the display unit, indication information on such a throttle operation as to reduce the pitching behavior (Step S105). Then, the processing of this flowchart is finished.

According to the embodiment described above, the pitching of the ship body is predicted on the basis of a plurality of images photographed by the camera mounted in the ship body, and the throttle of the ship body is controlled or the throttle operation performed by the occupant is assisted in accordance with the predicted pitching of the ship body. As a result, it is possible to execute driving assistance for the occupant of the ship more preferably.

The embodiment described above can be represented by the following expressions.

A ship assistance device including a storage medium storing a computer-readable command and a processor connected to the storage medium, the processor executing the computer-readable command to: calculate a pitching amount of a ship body based on a plurality of images photographed by a camera mounted on the ship body; estimate a pitching cycle of the ship body at least based on the calculated pitching amount; predict pitching of the ship body based on the estimated pitching cycle; and control a throttle of the ship body so as to reduce the predicted pitching of the ship body.

This concludes the description of the embodiment for carrying out the present invention. The present invention is not limited to the embodiment in any manner, and various kinds of modifications and replacements can be made within a range that does not depart from the gist of the present invention. For example, the present invention can be applied to power conversion equipment and grids, which can be connected to commercial power systems.

What is claimed is:

1. A ship assistance device comprising a storage medium storing a computer-readable command and a processor connected to the storage medium, the processor executing the computer-readable command to:
   calculate a pitching amount of a ship body based on a plurality of time-series images photographed by a single camera mounted on the ship body;
   estimate a pitching cycle of the ship body at least based on the calculated pitching amount;
   predict pitching of the ship body based on the estimated pitching cycle; and
   control a throttle of the ship body so as to reduce the predicted pitching of the ship body,
   wherein the processor estimates the pitching cycle by minimizing an evaluation function for evaluating an error between the pitching amount and a pitching amount estimation model constructed based on a variable obtained by adding a vibrating reference signal to each of an angular velocity and phase of the pitching, and
   wherein the processor defines the pitching amount estimation model by a sine wave, and estimates an amplitude of the sine wave based on the pitching amount and estimates an angular velocity and phase of the sine wave by minimizing the evaluation function.

2. The ship assistance device according to claim 1, wherein the processor cuts out a plurality of square regions from an image photographed at a predetermined time by shifting predetermined pixels among the plurality of time-series images, and calculates the pitching amount based on a plurality of shift amounts corresponding to the plurality of cut out square regions and a plurality of characteristic values of difference images between the plurality of cut out square regions and a reference region of an image photographed at a time subsequent to the predetermined time.

3. The ship assistance device according to claim 2, wherein the processor derives an approximation function that approximates a relationship between the plurality of shift amounts and the plurality of characteristic values, identifies a shift amount corresponding to the minimum value of the approximation function as a pitching variation amount, and integrates the pitching variation amount to calculate the pitching amount.

4. The ship assistance device according to claim 1, wherein the processor predicts the pitching of the ship body by advancing a phase of the pitching by a predetermined period from the estimated pitching cycle.

5. A ship assistance device comprising a storage medium storing a computer-readable command and a processor connected to the storage medium, the processor executing the computer-readable command to:
   calculate a pitching amount of a ship body based on a plurality of time-series images photographed by a single camera mounted on the ship body;
   estimate a pitching cycle of the ship body at least based on the calculated pitching amount;
   predict pitching of the ship body based on the estimated pitching cycle; and
   display such a throttle operation of the ship body as to reduce the predicted pitching of the ship body,
   wherein the processor estimates the pitching cycle by minimizing an evaluation function for evaluating an error between the pitching amount and a pitching amount estimation model constructed based on a variable obtained by adding a vibrating reference signal to each of an angular velocity and phase of the pitching, and
   wherein the processor defines the pitching amount estimation model by a sine wave, and estimates an amplitude of the sine wave based on the pitching amount and estimates an angular velocity and phase of the sine wave by minimizing the evaluation function.

6. The ship assistance device according to claim 5, wherein the processor cuts out a plurality of square regions from an image photographed at a predetermined time by shifting predetermined pixels among the plurality of time-series images, and calculates the pitching amount based on a plurality of shift amounts corresponding to the plurality of cut out square regions and a plurality of characteristic values of difference images between the plurality of cut out square regions and a reference region of an image photographed at a time subsequent to the predetermined time.

7. The ship assistance device according to claim 6, wherein the processor derives an approximation function that approximates a relationship between the plurality of shift amounts and the plurality of characteristic values, identifies a shift amount corresponding to the minimum value of the approximation function as a pitching variation amount, and integrates the pitching variation amount to calculate the pitching amount.

8. The ship assistance device according to claim 5, wherein the processor estimates the pitching cycle by minimizing an evaluation function for evaluating an error between the pitching amount and a pitching amount estimation model constructed based on a variable obtained by adding a vibrating reference signal to each of an angular velocity and phase of the pitching.

9. The ship assistance device according to claim 5, wherein the processor predicts the pitching of the ship body by advancing a phase of the pitching by a predetermined period from the estimated pitching cycle.

10. A ship assistance method to be executed by a computer, comprising:
    calculating a pitching amount of a ship body based on a plurality of time-series images photographed by a single camera mounted on the ship body;
    estimating a pitching cycle of the ship body at least based on the calculated pitching amount;
    predicting pitching of the ship body based on the estimated pitching cycle;
    controlling a throttle of the ship body so as to reduce the predicted pitching of the ship body;
    estimating the pitching cycle by minimizing an evaluation function for evaluating an error between the pitching amount and a pitching amount estimation model constructed based on a variable obtained by adding a vibrating reference signal to each of an angular velocity and phase of the pitching; and
    defining the pitching amount estimation model by a sine wave, and estimating an amplitude of the sine wave based on the pitching amount and estimating an angular velocity and phase of the sine wave by minimizing the evaluation function.

11. A computer-readable non-transitory storage medium storing a program for causing a computer to:
    calculate a pitching amount of a ship body based on a plurality of time-series images photographed by a single camera mounted on the ship body;
    estimate a pitching cycle of the ship body at least based on the calculated pitching amount;
    predict pitching of the ship body based on the estimated pitching cycle;
    control a throttle of the ship body so as to reduce the predicted pitching of the ship body;
    estimate the pitching cycle by minimizing an evaluation function for evaluating an error between the pitching amount and a pitching amount estimation model constructed based on a variable obtained by adding a vibrating reference signal to each of an angular velocity and phase of the pitching; and
    define the pitching amount estimation model by a sine wave, and estimate an amplitude of the sine wave based on the pitching amount and estimate an angular velocity and phase of the sine wave by minimizing the evaluation function.

* * * * *